UNITED STATES PATENT OFFICE.

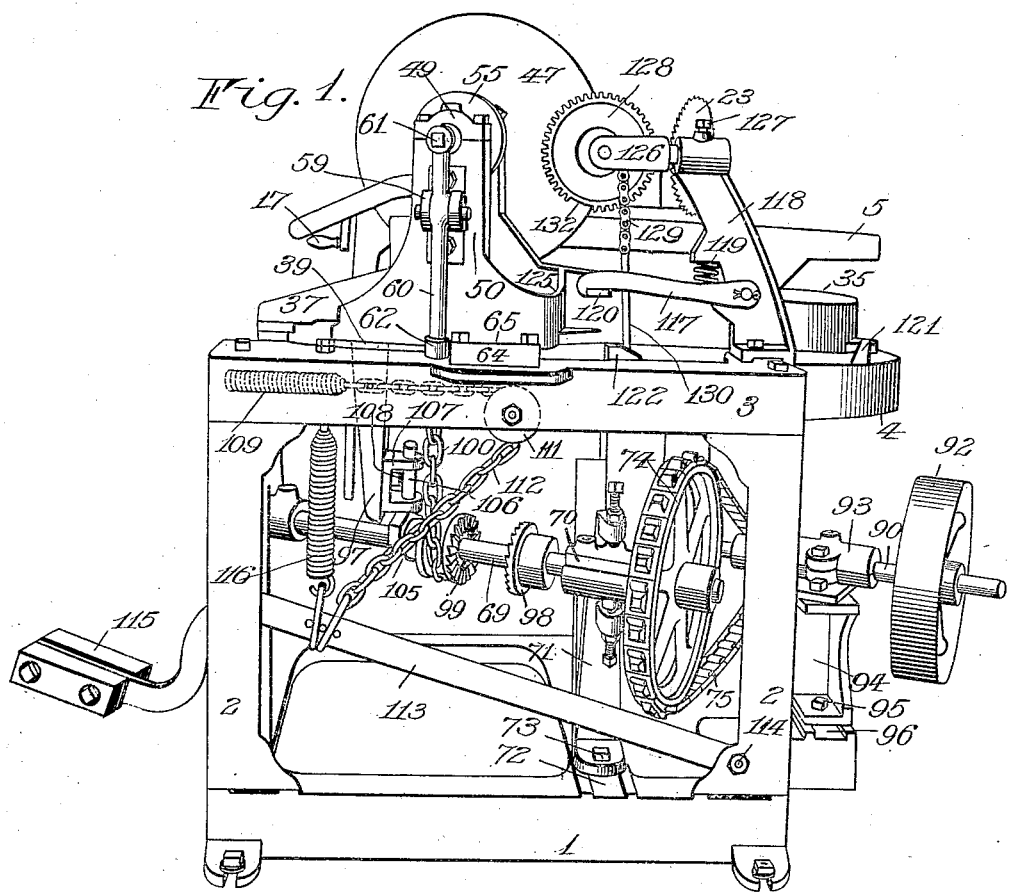

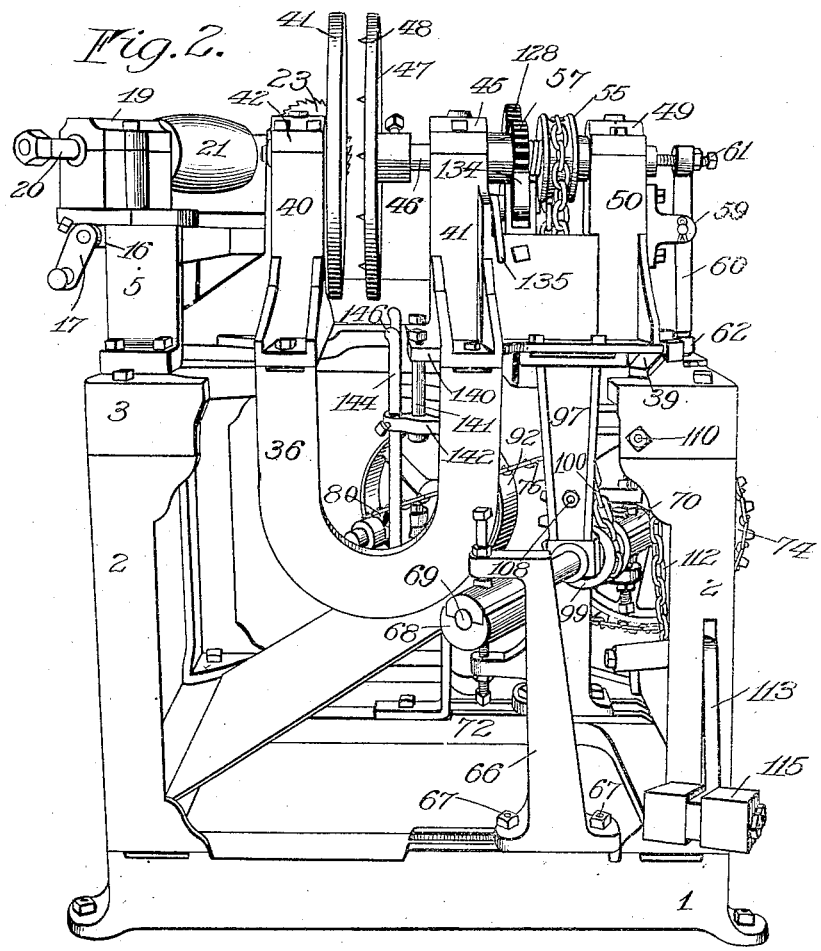

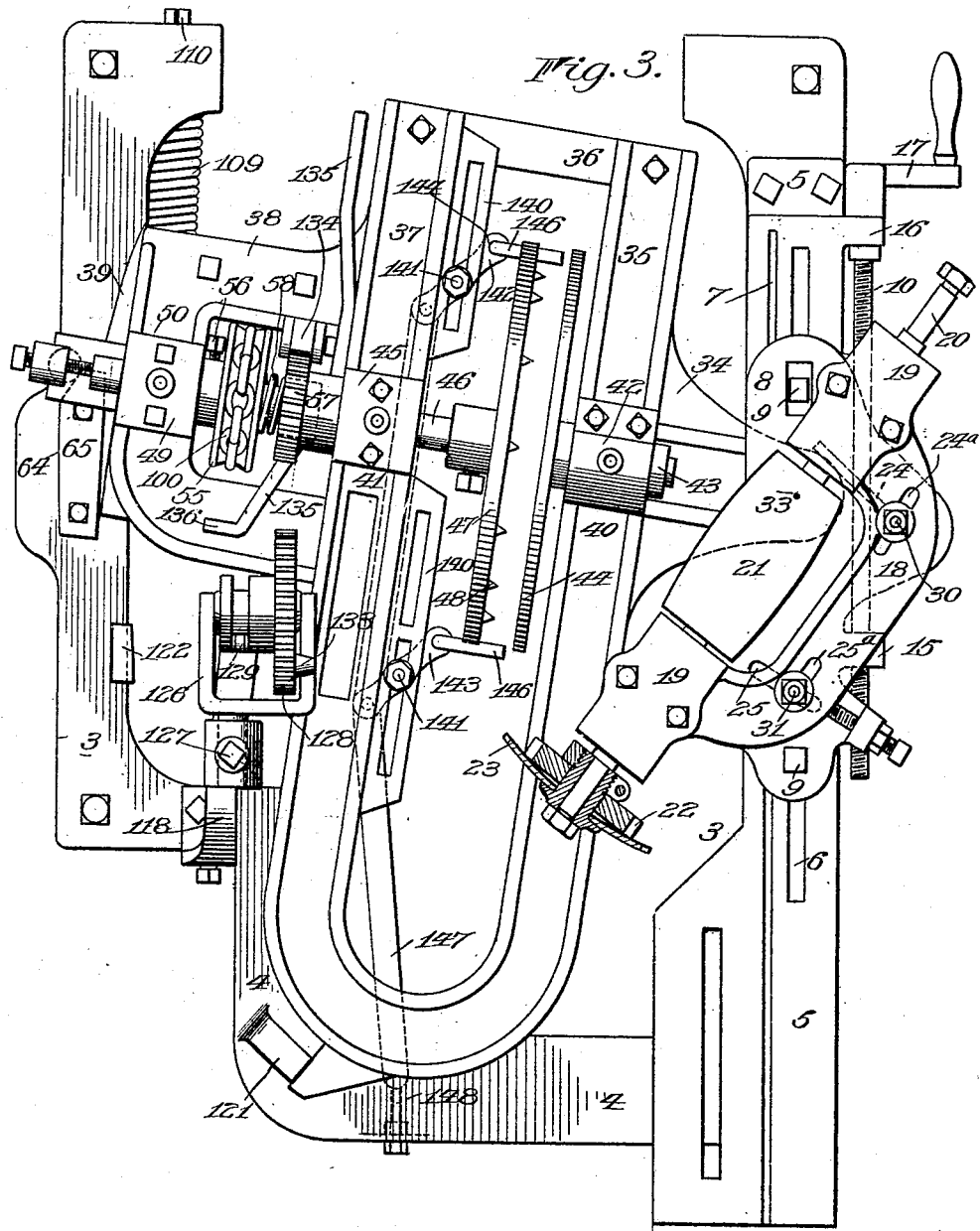

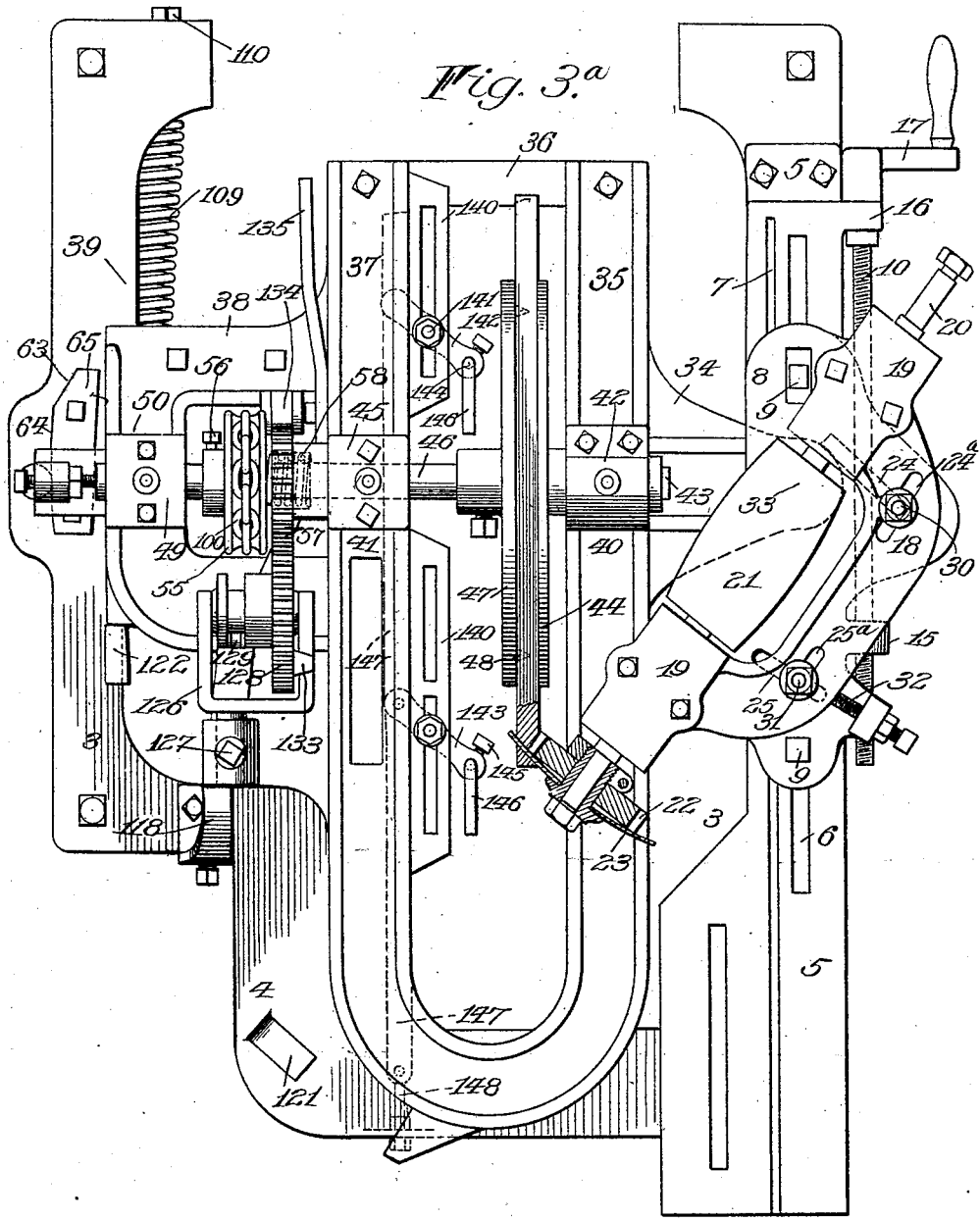

VINCENT J. HOULIHAN, OF ROCHESTER, NEW YORK, ASSIGNOR TO ROCHESTER COOPERAGE COMPANY, OF ROCHESTER, NEW YORK, A CORPORATION OF NEW YORK.

BARREL-HEAD TURNER.

No. 910,542.  Specification of Letters Patent.  Patented Jan. 26, 1909.

Application filed May 15, 1905. Serial No. 260,377.

*To all whom it may concern:*

Be it known that I, VINCENT J. HOULIHAN, of Rochester, in the county of Monroe and State of New York, have invented certain new and useful Improvements in Barrel-Head Turners; and I do hereby declare the following to be a full, clear, and exact description of the same, reference being had to the accompanying drawings, forming a part of the specification, and to the reference-numerals marked thereon.

My present invention relates to woodworking machines and particularly to that class for turning or sawing heads for barrels and it has for its object to provide a machine embodying generally a tool and a frame or carriage provided with clamping devices for holding a work piece which is capable of moving relatively to the tool to carry the work piece into engagement therewith.

My invention has for its further object to provide means for adjusting parts of the machine to permit barrel heads of various sizes to be formed together with improved mechanism for rotating the work clamp whereby the movement of the clamp may be arrested and the work piece released at the completion of the operation thereon and the carriage of the machine automatically operated into position to receive another work piece.

To these and other ends the invention consists in certain improvements and combinations of parts all as will be hereinafter more fully described, the novel features being pointed out in the claims at the end of the specification.

In the drawings: Figure 1 is a perspective view taken at one side of a machine embodying my invention, showing the parts in the normal or inoperative position. Fig. 2 is a similar view of the front of the machine, the carriage being shown in the operative position. Fig. 3 is a top plan view thereof illustrating the parts in the same position as that shown in Fig. 2. Fig. 3ᵃ is a top plan view showing the carriage in the inoperative position. Fig. 4 is a detail view of the mechanism employed for locking the carriage in operative position and the releasing devices coöperating therewith. Fig. 5 is a detail sectional view of the connecting devices between the movable clutch member and the carriage.

Similar reference numerals in the several figures indicate similar parts.

A turning machine constructed in accordance with my invention may be employed either for cutting tight barrel heads or slack barrel heads and it comprises a rectangular base 1 supporting corner posts 2 on which is mounted a top piece 3 extending at each side and across one end where it projects rearwardly as indicated at 4. Surmounting the top piece, at one side thereof, is a supplemental frame 5 provided with a longitudinally extending slot 6 and a rib or guide 7, arranged parallel thereto, serving to guide a bed plate 8 which may be secured by bolts 9, the bodies of which project through the slot and are provided with suitable nuts or clamping devices upon their lower ends, as will be understood. Longitudinal adjustment of the bed plate may be had, when the bolts 9 are released, by the rotation of a screw 10, threaded in a laterally projecting boss 15 and journaled in a boss 16 on the frame 5, which may be operated by a crank arm 17. Mounted on the bed plate is a mandrel frame 18 having the separated journal boxes 19 supporting a mandrel 20 carrying a driving pulley 21 and provided at its outer end with a tool. As the latter is adapted to form the inner and outer bevels of a barrel head at a single operation it is preferably made in the form of a circular saw composed of inner and outer members 22 and 23 having their cutting edges disposed at an angle to each other, as shown in Fig. 3.

In order to enable the angular position of the mandrel to be altered so that the cutting edges of the tool may be positioned to cut the croze, or apex of the angle between the two bevel edges, in the desired location, relatively to the two faces of the barrel head, the mandrel frame is also adjustably supported on the bed plate. The latter is provided with two slots 24 and 25, shown in dotted lines in Fig. 3, which extend at an angle to the direction of movement of said plate and the mandrel frame is provided with similar slots 24ᵃ, 25ᵃ extending transversely of the slots 24 and 25 and passing therethrough are bolts the heads of which engage the under side of the bed plate while the nuts or clamping devices 30 and 31 engage the face of the frame 18. An adjusting screw 32 is also carried on the bed plate and engages the inner end of the frame 18 to permit the operator to accurately adjust it and to prevent the tool from becoming accidentally displaced.

Pivoted to the side of the top piece 3, beneath the frame 5, at the point indicated by 33 is an arm 34 supporting the side 35 of a U-shaped carriage, which is open in its forward end to facilitate the insertion of the work pieces said side being connected at its forward end, by a depending U-shaped brace 36 with its corresponding side piece 37, supported by a laterally extending arm 38, resting on a guide 39 on the top piece 3. Projecting upwardly from the side pieces of the U-frame are arms 40 and 41 the former being provided with a bearing 32 in which is journaled a stud shaft 43 on a relatively stationary clamping plate or disk 44. A similar bearing 45 is arranged on the arm 41 and journaled therein is a shaft 46 carrying at its outer end a plate or disk 47 provided with teeth or projections 48 adapted to engage a work piece. The centers of the shafts 43 and 46 extend radially from the center of rotation of the carriage and also in the plane of the mandrel shaft 20 enabling a barrel head to be cut by a rotary tool while the blank operated upon is also rotated toward the tool, without causing the parts to bind. The outer end of the shaft 46 is supported in a bearing 49 on a standard 50, projecting upwardly from the end of the arm 38 and between it and the bearing 45 is a driving pulley, such as a sprocket wheel, 55 rigidly secured to the shaft by a set screw 56, and a gear wheel 57 having an enlarged recessed hub, abutting the bearing 45, and containing a coiled spring 58, bearing against the proximate face of the driving pulley 55, normally operating to move the shaft 46 laterally to carry the clamping member 47 away from the member 44. Extending laterally from the standard 50 are arms 59 between which is pivoted a lever 60 carrying at its upper end a set screw 61, bearing against the end of the shaft 46, and having at its lower end a shoe, or roller, 62 coöperating with the surfaces 63 and 64 on a stationary cam 65 which operates the lever to project the shaft and hold the clamping member 47 in engagement with the work piece, when the carriage is rotated into operative position, as shown in Fig. 3.

On the forward edge of the base 1 of the machine is an adjustable standard 66, secured by a bolt 67, carrying at its upper end a journal box 68 supporting one end of an angularly disposed counter shaft 69, the other extremity thereof being supported in a similar bearing 70, held on a standard 71, adjustable laterally on a cross piece 72 of the frame to which it is secured by a bolt 73. At the rear end of the counter shaft is a driving pulley 74, preferably in the form of a sprocket wheel, connected by a chain 75 with a sprocket wheel 80 on a shaft 90 carrying a driving pulley 92, said shaft being carried in a bearing 93 mounted on a standard 94 adjustably secured by a bolt 95 to an arm 96 on the rear of the frame 1.

The counter shaft 69 is located beneath the outer edge, or side portion 37, of the carriage and in substantial alinement with the direction of movement of a bracket 97, depending from the arm 38, whereby a clutch member on the shaft may be automatically thrown into and out of engagement with its coöperating member, as the carriage is rotated to swing the barrel head blank into and out of engagement with the tool. The shaft 69 is provided with a stationary clutch member 98 having teeth or serrations thereon with which coöperates a corresponding movable member 99. The latter is connected with the pulley 55 by a driving connection, such as a chain 100, and at its outer end is provided an annular recess 105 receiving the bifurcated end of an arm 106, journaled in a bearing 107, rocking on a journal pin 108 on the bracket 97, said parts forming a swivel connection between the movable clutch members and the carriage and compensating for the difference between the lineal movement of the clutch member and the arc described by the bracket 97 when the carriage is rotated about its pivot 33.

The normal position of the carriage is that shown in Figs. 1 and 3ª and it is returned to this position after each operation by a coiled spring 109 secured to the bracket 97 and to the main frame of the machine by a bolt 110, its rotary movement being limited by stops 121 and 122. Extending forwardly from the bracket 97 and leading over a pulley 111 is a chain 112, or equivalent connection, attached to a lever 113, pivoted at 114, and having at its outer end a treadle 115, projecting at the forward end of the machine, which is normally elevated by a coil spring 116, as shown in Fig. 1. Suitable locking devices are employed to hold this carriage in operative position, comprising, in the present instance, a latch 117, pivoted to an arm 118, and normally operated in one direction by a spring 119, whereby its outer end 120 may be elevated to engage in rear of a shoulder 125 on the carriage to hold the latter in operative position. In order to provide for the automatic release of the carriage when the turning operation is completed and also to enable the operator to release the carriage at any part of the operation certain mechanism is provided for disengaging the latch 117. At the upper end of the arm 118 is a horizontally adjustable fork bearing 126, secured by a set screw 127, carrying a gear wheel 128 adapted to be intermittently operated by engagement with the gear wheel 57 secured to the shaft 46 by a feather or key 57ª. Attached to the hub of the gear wheel 128 is a flexible connection 129 having suspended thereon a rod 130 provided with a head 131 adapted to engage the lower side of the latch to elevate it out of engagement with the shoulder 125 on the carriage. The gear wheels 57 and 128 and rod 130 are so proportioned that at each rotation of the former the latter is moved sufficiently to wind up the connection 129 and cause the release of the carriage at the completion of the turning operation. At one point of the circumference of the gear wheel 128 several of its teeth are removed, as indicated at 132, to prevent injury to one or both of said wheels in case the operator neglects to remove his foot from the treadle 115, or, if as it may occur in some cases he desires to rotate the barrel head blank in engagement with the cutting tool for more than a complete rotation. At one side of the gear wheel 128 is a lug or projection 133 adapted to engage one side of the fork arm to limit its rearward rotation, when the gear wheel 57 is carried out of engagement therewith. A pawl 134 also engages the gear wheel 57 to prevent rearward rotation of the shaft 46. The manual release of the carriage is effected by a lever arm 135 pivoted to the side of the arm 41 and having the end 136 located in proximity to the shoulder 125, as shown in Fig. 4.

On the inner side of the arm 37 of the carriage are slotted flanges 140 from which depend adjustable posts 141 carrying pivoted rock arms 142 and 143 arranged, respectively, in front and in rear of the shaft 46 and carrying vertically adjustable arms 144, held by set screws 145, and having laterally extending ends 146 on which the operator may rest a barrel head blank in order to insure its being centered accurately in the work clamp. As it is necessary that these supports be removed out of the plane of rotation of the blank the outer ends of the levers 142 and 143 are connected to a bar 147 (shown in dotted lines in Fig. 3) which is pivotally connected to an arm 148 bolted to the rearwardly extending portion 4 of the top piece 3 and adapted when the carriage is rotated into operative position to rotate the levers as shown in Figs. 2 and 3.

The operation of the machine will now be readily understood. Presuming that the operator has adjusted the mandrel frame 18, as heretofore described, to bring the cutting tool in the proper position, as shown in Fig. 3, and that the mandrel 20 and the driving shaft 90 are rotated continuously, by suitable driving belts passing around the pulleys 91 and 92, it will be seen that the counter shaft 69 is rotated by the driving connection 75 and that, when the clutch members 98 and 99 are brought into engagement, the shaft 46 will be rotated by the connection 100. However, when the carriage is in its normal position, as shown in Figs. 1 and 3ª, the shaft 46 is at rest and the rock levers 142 and 143 are rotated to turn the supports or rests 146 into the plane of the work clamp. The operator then inserts the barrel head blank between the disk or plates 44 and 47 and, by stepping on the treadle 117, rotates the carriage into the position shown in Figs. 2 and 3. At the commencement of the rotation of the carriage the shoe or roller 62 engages the cam surface 63, on the cam 65, rocking the lever 60 and causing the shaft 46 to be moved longitudinally in its bearings 48 and 49, against the tension of the spring 58, to firmly clamp the work piece. During the swinging movement of the carriage the movable clutch member 99 is carried into engagement with its relatively stationary member 98 and the rotary motion thereof is transmitted to the parts of the work clamp as the edge of the work piece, or blank, is brought into engagement with the tool, or saw, composed of members 22 and 23. The gear wheels 57 and 58 may engage at the beginning of the cutting movement causing the rod 130 to be elevated to disengage the latch 117 and release the carriage after the work clamp has made a complete rotation, permitting it to be returned to its normal position by the spring 109. The return movement of the carriage carries the lever 60 out of disengagement with the cam 65 and allows the spring 58 to retract the shaft 46 and open the work clamp when the finished barrel head may be removed and a new blank be inserted.

Other driving connections may be employed in lieu of the driving connections 75 and 100 although I preferably employ the endless chains that I have shown, as they provide simple and convenient means of connection not liable to disarrangement and which facilitate adjusting the various parts without requiring great accuracy in the operation of assembling the machine.

I claim as my invention:

1. In a wood working machine, the combination with a frame, a tool thereon and a horizontally swinging carriage movable relatively thereto, of a rotary work clamp on the carriage, a work support located in alinement with the clamp and adjustably supported on the carriage and adjustable relatively to the clamp to position work pieces of different sizes and means for operating the carriage, mechanism for moving the support out of the path of a work piece and means for rotating the work clamp.

2. In a wood working machine, the combination with a frame, a tool thereon and a horizontally swinging carriage movable relatively thereto, of a rotary work clamp on the carriage, a movable arm thereon, a work support adjustable on the arm and located in alinement with the clamp and means operated by the movement of the carriage for operating the arm to move the support out of the path of a work piece, devices for adjusting the carriage and means for operating the work clamp.

3. In a wood working machine, the combination with a frame, a tool thereon, a pivoted carriage movable relatively thereto and a revoluble work clamp on the carriage, of pivoted work supports arranged in alinement with the clamp, connections between them and means operated by the movement of the carriage for simultaneously rotating them out of their normal position, devices for operating the carriage and means for rotating the work clamp.

4. In a wood working machine, the combination with a frame, a tool thereon and a carriage pivoted on the frame having a revoluble work clamp thereon, ways on the carriage and supports adjustably secured to the ways, of arms pivoted on the supports, work rests on the arms and means operated by the movement of the carriage for simultaneously operating them into and out of alinement with the work clamp and devices for operating the carriage.

5. In a wood working machine, the combination with a frame, a tool thereon, a movable carriage pivoted on the frame and a latch coöperating therewith to retain it in operative position, of a rotary member mounted on the frame and a connection between it and the latch, a revoluble work clamp on the carriage having a part adapted to actuate the rotary member, means for swinging the carriage into engagement with the latch and the actuating part into engagement with the rotary member and means for rotating the clamp.

6. In a wood working machine, the combination with a frame, a tool thereon and a movable carriage, a latch on the frame coöperating with the carriage, a gear wheel mounted on the frame and a connection between it and the latch for releasing the latter, of a revoluble work clamp on the carriage, a pinion rotated by said clamp and adapted to engage the gear wheel, means for operating the carriage into engagement with the latch and the pinion into engagement with the gear wheel, a releasing lever supported on the carriage and adapted to coöperate with the latch and means for rotating the work clamp.

7. In a wood working machine, the combination with a frame, a tool thereon, a swinging carriage mounted on the frame and movable relatively to the tool and a revoluble work clamp thereon, of an operating shaft journaled on the frame, driving and driven clutch members on the shaft, a driving connection between the clamp and driven clutch member, means for adjusting the carriage and connection between the swinging carriage and one clutch member for moving the latter into engagement with the other clutch member.

8. In a wood working machine, the combination with a frame, a tool thereon, a swinging carriage mounted on the frame and movable relatively to the tool, and a revoluble clamp thereon, of an operating shaft journaled on the frame beneath the carriage, driving and driven clutch members on the shaft, a driving connection between the clamp and the driven clutch member, a bracket depending from the carriage, and an arm journaled on the bracket and engaging one of the clutch members to move it into engagement with the other 9. In a wood working machine, the combination with a frame, an oscillatory work supporting carriage thereon and a revoluble work clamp on the carriage, of a shaft supported on the frame beneath the carriage, a driving clutch member secured to the shaft and a driven clutch member attached to the carriage and movable longitudinally of the shaft, means for moving the carriage into and out of operative position and a tool adapted to coöperate with a work piece when the carriage is in the operative position, a driving connection between the work clamp and driven clutch member and means for driving the shaft.

10. In a wood working machine, the combination with a frame, an oscillatory carriage thereon and a revoluble work clamp on the carriage, of a shaft supported on the frame beneath the carriage, a driving clutch member secured to the shaft and a driven clutch member movable relatively thereto, a universally movable connection between the carriage and driven clutch member and sprocket wheels connected to the latter and the work clamp, an endless chain passing over said wheels and means for rotating the shaft, devices for moving the carriage into and out of operative position and a tool adapted to engage a work piece in the clamp when the carriage is adjusted into operative position.

VINCENT J. HOULIHAN.

Witnesses:
G. WILLARD RICH,
RUSSELL B. GRIFFITH.